United States Patent Office 3,439,026
Patented Apr. 15, 1969

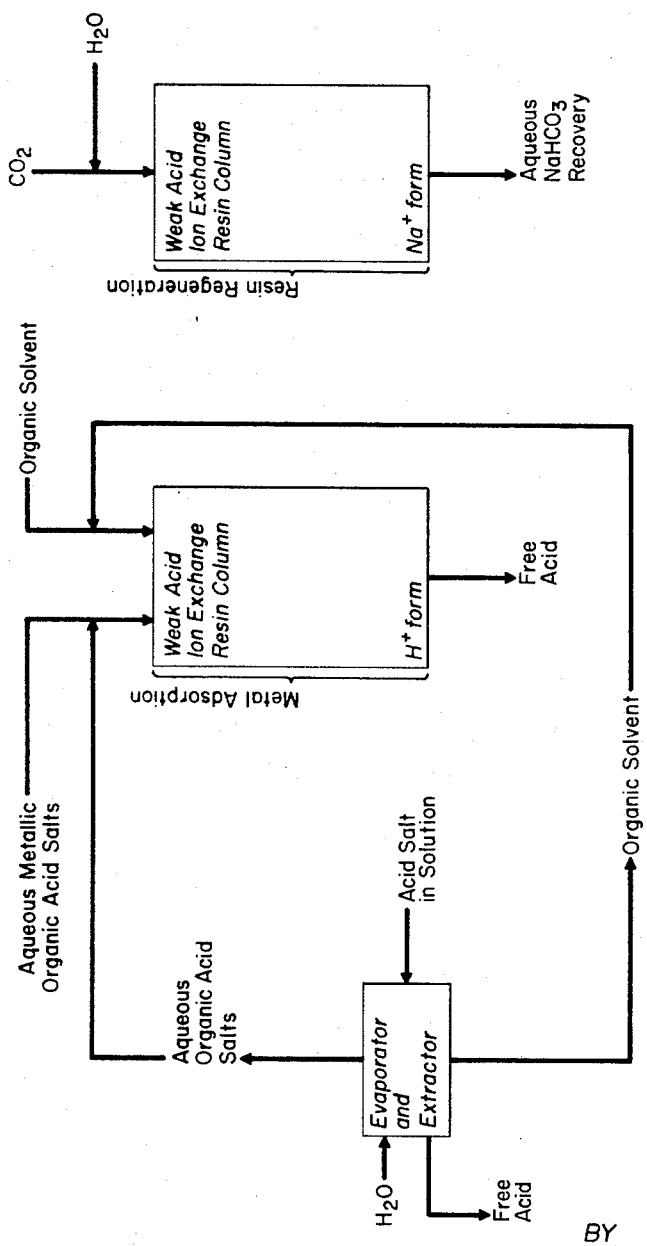

3,439,026
MANUFACTURE OF CARBOXYLIC ACIDS FROM
CORRESPONDING METALLIC SALTS
James W. Patton and Marion O. Son, Jr., Littleton, Colo.,
assignors to Marathon Oil Company, Findlay, Ohio, a
corporation of Ohio
Filed Dec. 23, 1964, Ser. No. 420,502
Int. Cl. C07c 51/02, 51/00
U.S. Cl. 260—515                                    12 Claims

ABSTRACT OF THE DISCLOSURE

The present invention comprises a process for the manufacture of carboxylic acids from their corresponding metallic salts comprising treating the salts with a weak protonic ion exchange resin, thereafter removing substantially all of any excess of the salt which remains uncombined with the resin, thereafter eluting the resin with an organic solvent in which the carboxylic acid is soluble and thereafter recovering the carboxylic acid from the resulting solution, and related processes.

---

This invention relates to new processes for the manufacture of carboxylic acids from the corresponding organic salts and in particular relates to the use of ion exchange resins for the conversion of the metallic salts of organic acids into the corresponding organic acids.

Among the various methods previously used for the recovery of carboxylic acids from their salts have been acidification with a mineral acid, reaction with carbon monoxide or with carbon dioxide. None of these methods have been entirely satisfactory. Acidification with mineral acids is relatively costly due to the high amount of by-products which are usually of relatively low value and are not readily disassociated into the acid to permit recycling. Carbon monoxide and carbon dioxide require relatively high pressures in order to obtain satisfactory yields and therefore present certain handling problems together with the requirement of relatively specialized apparatus.

The present invention embodies the discovery that the metal salts of organic acids may be converted to the corresponding organic acids by treatment with a weak protonic (acid-type) ion exchange resin, followed by elution of the ion exchange resin with an organic liquid in which the organic acids and salts are soluble. Whereas elution of ion exchange resin with water yields almost complete recovery of the metal salts, the present invention utilizes the discovery that by using organic solvents in place of water for elution, a high yield is obtained of the organic acid. The organic acid may be readily separated from the organic eluting liquid by conventional means such as evaporation and extraction in order to obtain the free organic acid in substantial yields. Unconverted metallic salts which have dissolved in the organic eluting liquid may also be separated and recycled through the ion exchange column.

A wide variety of organic acid metal salts may be advantageously employed in the practice of the present invention, including straight-chain compounds such as sodium acetate, sodium butyrate, sodium heptanoate, sodium caproate, and others; cyclic saturated hydrocarbon based acid salts; heterocyclic-based acid salts such as sodium nicotinate and others; and alkylaromatic acid salts such as sodium benzoate, sodium naphthoate, and others. The preferred metal salts are the alkylaromatics which, in addition to the aforementioned compounds include the following compounds among others: sodium p-toluate, dipotassium terephthalate, disodium naphthalene-2,3-dicarboxylate, dipotassium naphthalene-2,6-dicarboxylate, trisodium trimesate, disodium adipate, disodium maleate.

The metal salts of organic acids discussed above may be prepared by a variety of conventional means including reaction of esters with alkali at a temperature of from about 50 to about 100° C. Alternatively, the metal salts of organic acids utilized as raw materials for the present invention may be prepared by the process disclosed in our copending application of the same assignee, Ser. No. 420,503, filed Dec. 23, 1964, by M. O. Son, Jr. and J. W. Patton.

Particularly preferred for the practice of the present invention are weakly protonic (acid-type) ion exchange resins which may be regenerated with $CO_2$ thus permitting the economically attractive cyclic process which is discussed in connection with the figure. The most preferred ion exchange resins are the carboxylic acid types.

Also, the organic solvents which are preferred for the process of the present invention are those in which both the organic acid produced and the organic acid salt used as raw material are soluble. The solvents utilized should, of course, not be reactive with the ion exchange resins or with the acid or the acid salt.

In the practice of the invention, a solution of carboxylic acid metal salts is run through a weak protonic (acid-type) ion exchange resin packed in an ion exchange column of conventional design preferably operating at atmospheric pressure and temperature. As concentrated a solution of the salts as possible is preferably used. When the solution is on the column (after the solution has flowed into the column and before a substantial amount of solute has emerged from the column), elution is begun with an organic solvent in which the acids and preferably the salts are soluble. In the presence of the organic solvent (but not in elution with water), the ion exchange resin which is originally in the $H^+$ form is gradually transformed to the metallic form and the aromatic carboxylate salt is transformed to the corresponding free acid. Elution of the column with the organic solvent is continued until the column is free of the aromatic acid.

The organic solvent may be selected from any of a number of organic liquids which are not reactive with the ion exchange resin or with the aromatic acids or their metal salts including among others: methanol, ethanol, dimethylformamide, dimethylsulfoxide, and acetone.

The figure is a schematic drawing illustrating a preferred embodiment of the present invention.

In the figure aqueous solutions of metallic salts of organic acids are fed to the weak protonic ion exchange resin column 1 in as concentrated a solution as is possible. While the solution is on the column, elution is begun with a nonreactive organic solvent in which the desired organic acids are soluble. Elution is conducted sufficiently slowly so that an average contact time is about 10 minutes to about 10 hours and preferably about 1 hour is maintained. In the presence of the organic liquid, the acid salts react with the ion exchange resin in the column converting the exchange resin gradually to the metal salt (metallic) form. Elution with solvent is continued until the column has been washed free of the desired organic acid and any salt which has failed to react. The effluent from this elution of the column is collected and evaporated conventionally to remove the eluting solvent. The residue from this evaporation is then extracted with water to remove any remaining organic acid metal salts.

After recovery of the acid from the column by elution with organic solvent, the resin in the column remains at least partially converted to the metallic form and must be regenerated. In the figure an exhausted weak acid ion exchange resin column which has been converted to the sodium form is shown being regenerated by the introduction of $CO_2$ at pressures of from 50 to about 500 p.s.i. or higher, together with water. The effluent from the regenerating column is aqueous $NaHCO_3$ solution which is preferably decomposed by heat or other means to form sodium carbonate and $CO_2$. The resulting $CO_2$ may be recycled to be used in the regeneration of other exhausted ion exchange resin and the alkali carbonate may be utilized in conjunction with air to oxidize alkylaromatics to form the metal salts of alkylaromatic acids which may then be converted to the free acids according to the process of the present invention. Oxidation processes utilizing sodium carbonate in conjunction with air and also $CO_2$ in conjunction with various chromates and dichromates are disclosed in our copending application of the same assignee, Ser. No. 420,503, filed Dec. 23, 1964, by M. O. Son, Jr. and J. W. Patton.

We can utilize a variety of temperatures and pressures during the conversion of the metal salts to their free acids and during the process of regeneration. During both processes the temperature will probably be from about 0 to about 70° C. and most preferably will be from about 15 to about 40° C. Pressure during the conversion of the metal salts to the free acids can be from about 1 p.s.i.g. to over 1,000 p.s.i.g. with atmospheric pressures generally being preferred. Pressure during regeneration of the ion exchange resin will be as discussed above.

It should be understood that while sodium and other alkali metals have been used in this application to illustrate the invention, the invention is applicable to the organic acid salts of other metals provided that they have reasonable solubility in some suitable non-reactive organic solvent system so they may be eluted from the ion exchange resin columns with efficiency.

EXAMPLE I

Preparation of benzoic acid from sodium benzoate

Approximately 1.44 parts by weight of sodium benzoate and 10 parts by weight of water are flowed into a weak acid ion exchange column containing approximately 10 parts by weight of Amberlite IRC–50, manufactured by Rohm and Haas, which is in its acid form. As soon as the aqueous phase is on the column, the column is eluted slowly with about 100 parts by weight of methanol over a period of about 60 minutes.

Evaporation of the solvent from the effluent and water extraction of the residue yields about 0.554 part by weight of benzoic acid and an aqueous solution of sodium benzoate which can be recycled.

EXAMPLE II

Preparation of terephthalic acid from sodium terephthalate

When the procedure of Example I is repeated using similar quantities of sodium terephthalate in place of the sodium benzoate and larger quantities of methanol for elution, terephthalic acid is recovered in substantial quantities from the effluent by evaporation of the solvent and water extraction of the resulting residue. The larger quantities of methanol used for elution are required because terephthalic acid is less soluble in methanol than is benzoic acid.

EXAMPLE III

Preparation of benzoic acid using other ion exchange resins

When the procedures of Example I are repeated using sodium benzoate and methanol in conjunction with Rohm and Haas weak protonic ion exchange resins BD–129B, B–0681, and XE–232, respectively, yields equal to or higher than those obtained in Example I are achieved in each case.

What is claimed is:
1. A process for the manufacture of carboxylic acids from their corresponding alkali metal salts comprising treating aqueous solutions of the salts with a weak protonic ion exchange resin, thereafter eluting the resin with an organic solvent in which the carboxylic acid is soluble and thereafter recovering the carboxylic acid from the resulting solution.

2. The process of claim 1 wherein both the carboxylic acid and the corresponding metal salt are soluble in the organic solvent.

3. The process of claim 2 wherein the carboxylic acid salts are aromatic carboxylic acid salts.

4. The process of claim 3 wherein the carboxylic acid salts are the sodium salts of aromatic carboxylic acids having from 7 to about 15 carbon atoms.

5. The process of claim 2 wherein the metallic salts in the starting material comprise at least 50% by weight of sodium benzoate.

6. A process for the manufacture of aromatic carboxylic acids comprising treating aqueous solutions of the corresponding metallic salts in an ion exchange column containing a weak protonic ion exchange resin, thereafter when said ion exchange column is substantially exhausted by conversion to the metallic form, eluting said ion exchange column with an organic solvent in which the carboxylic acids are soluble and separating carboxylic acids from the effluent of such elution of the ion exchange column.

7. The process of claim 6 wherein both the metal salts and the corresponding acids are soluble in the organic solvent used for elution.

8. The process of claim 7 wherein the ion exchange column is thereafter regenerated by return to the substantially protonic form and is thereafter used to treat additional quantities of metallic aromatic carboxylic acid salts and is thereafter eluted after it has been again returned to the substantially metallic form.

9. The process of claim 8 wherein the ion exchange column contains a carboxylic acid type ion exchange resin.

10. The process of claim 9 wherein the ion exchange column is regenerated by treatment with $CO_2$ and water and wherein $NaHCO_3$ is produced during the regeneration process.

11. The process of claim 10 wherein the aqueous solutions of aromatic carboxylic acid metal salts are produced by the oxidation of the corresponding alkylaromatics by treatment with $CO_2$ and alkali metal chromates.

12. The process of claim 11 wherein the $NaHCO_3$ produced by the subsequent treatment of the ion exchange resin with $CO_2$ is recovered and decomposed to produce $Na_2CO_3$ and $CO_2$ for use in oxidation of additional quantities of alkylaromatic hydrocarbons.

References Cited

Bodamer et al.: Ind. and Eng. Chem., vol. 45, pp. 2577–80 (1953).

Rasmussen et al.: J. Pharmacy and Pharmacology, vol. 4, pp. 566–72 (1952).

Calmon et al.: Ion Exchangers in Organic and Biochemistry (1957) pp. 136–137, 148, and 694. QD561C3.

LORRAINE A. WEINBERGER, *Primary Examiner.*

M. G. BERGER, *Assistant Examiner.*

U.S. Cl. X.R.

260—514, 537, 540, 541, 295.5